United States Patent [19]

Kopp

[11] 4,394,665
[45] Jul. 19, 1983

[54] ELECTRICAL CONTACT FOR CONDUCTIVE-BACKED PAPER

[75] Inventor: Gerald F. Kopp, Pine, Colo.

[73] Assignee: Honeywell Inc., Minneapolis, Minn.

[21] Appl. No.: 382,039

[22] Filed: May 26, 1982

[51] Int. Cl.³ .......................................... G01D 15/16
[52] U.S. Cl. ............................. 346/76 R; 346/110 R
[58] Field of Search ............... 346/1.1, 110 R, 76 PH, 346/146, 139 A–139 C, 76 R; 219/216

[56] References Cited

U.S. PATENT DOCUMENTS

| | | | |
|---|---|---|---|
| 3,204,249 | 8/1965 | Shaler et al. | 346/139 C |
| 3,319,251 | 5/1967 | Reis | 346/1.1 |
| 4,193,078 | 3/1980 | Esposito | 347/76 R |
| 4,213,136 | 7/1980 | Jenkins, Jr. et al. | 346/139 C |
| 4,236,834 | 12/1980 | Hafer et al. | 346/76 R X |

Primary Examiner—Donald A. Griffin
Attorney, Agent, or Firm—Charles J. Ungemach

[57] ABSTRACT

An electrically conductive wire brush for use with a conductive-backed recording paper to conduct electrical energy to the conductive backing of the paper thereby heating it to develop an image, the brush making flexible contact with the paper substantially continuously throughout its width.

7 Claims, 3 Drawing Figures

ELECTRICAL CONTACT FOR CONDUCTIVE-BACKED PAPER

BACKGROUND OF THE INVENTION

This invention relates to a recorder with an improved apparatus for making electrical contact to a conductive-backed web material upon which information is recorded and more particularly to a special brush composed of electrically conductive fibers, bristles or strands to contact dry-silver, carbon-backed recording paper. Prior art electrical contact was made with beryllium copper fingers such as is shown in the Esposito U.S. Pat. No. 4,193,078 issued Mar. 11, 1980 and the Jenkins, Jr. et al U.S. Pat. No. 4,213,136 issued July 15, 1980, and both assigned to the assignee of the present invention. While these contacts did a satisfactory job in most instances, it has been found that the fingers used therein may contribute to non-uniform processing of the conductive-backed dry-silver paper due to the coarseness of the fingers and the spaces between them. Furthermore, the fingers were subjected to damage by being bent or broken during regular or irregular use of the apparatus such as, for example, when the paper was removed from the recorder and pulled across the fingers in a direction opposite to its normal movement.

SUMMARY OF THE INVENTION

The present invention overcomes the above problems by providing a conductive wire brush composed, in the preferred embodiment, with a plurality of fine stainless steel bristles clamped in an aluminum extrusion, for example. The bristle ends are in contact with the carbon backing throughout the full width of the paper and thus provide essentially a continuous contact with the paper which helps prevent non-uniform processing and since the stainless steel elements are extremely flexible, damage during normal and abnormal operation does not occur.

DETAILED DESCRIPTION OF THE PREFERRED EMBODIMENT

Figure 1:
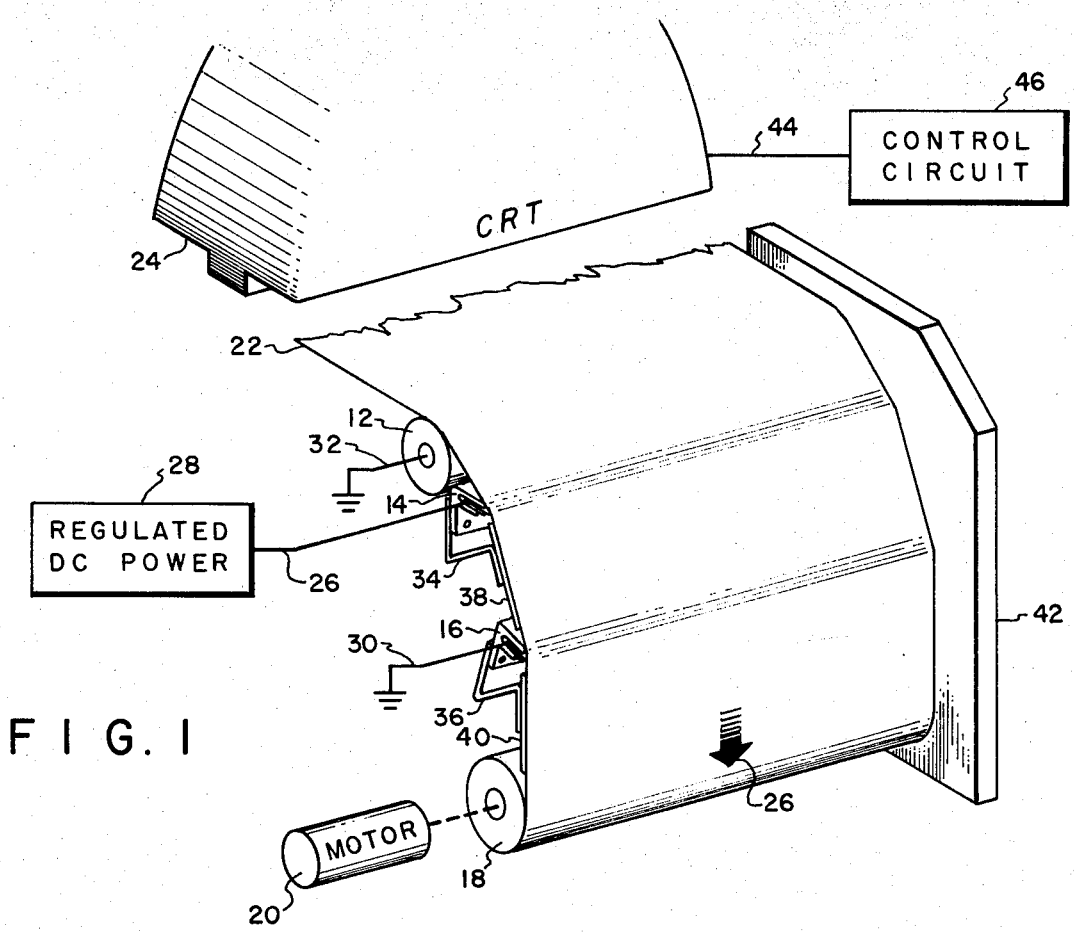
FIG. 1 is a fragmentary prospective view of a recorder showing the path of the paper on which the image is to be recorded and the present invention in contact with the paper.

FIG. 1 shows an upper roller contact 12, an intermediate brush contact assembly 14, a lower brush contact assembly 16 and a lower roller 18 shown driven by a motor 20 so as to move a carbon-backed, dry-silver paper web 22 past a cathode ray tube 24 in a direction shown by arrow 26. In actual practice, rollers 12 and 18 are part of a pair of pinch rollers and are connected by a belt to provide for tension in the paper. These elements have been omitted for clarity. The first brush assembly 14 is connected by a conductor 26 to a regulated DC power supply 28 for energization thereby and the lower brush assembly 16 is connected by a conductor 30 to ground. Roller 12 is also connected by a conductor 32 to ground. Brush assemblies 14 and 16 are attached to members 34 and 36 respectively which are in turn connected to backing members 38 and 40 respectively which are supported by a housing 42. CRT 24 is connected by a conductor 44 to a control circuit 46 which operates to produce a beam from CRT 24 to create an image on paper 22. In a typical recorder, the beam from CRT 24 impinges on the dry-silver coating of paper 22 to create an image which is developed by heat that is generated in the region between contact 14 and contacts 12 and 16 by a current flowing in the conductive backing on the paper.

Figure 2:
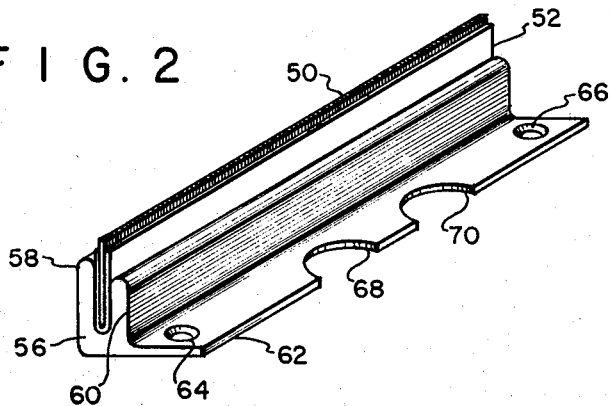
FIG. 2 is a perspective view of the brush of the present invention.

Referring now to FIG. 2, the brush contact structure is shown comprising a large number of individual fine wire elements or bristles 50 which are clamped in an extrusion 52. In the preferred embodiment, the conductive bristles 50 are fine stainless steel fibers of approximately 12 microns diameter and with a filament density of between about 18,000 to 20,000 per inch. The extrusion 52 is preferrably aluminum and the filaments 50 extend beyond the end of the extrusion 52 approximately 0.125 inches so as to allow bending when in contact with the paper. Of course, the filament density, the size of the filaments and the extension beyond the extrusion are matters of design choice and will vary to meet various specifications. Stainless steel is preferred as a brush element since it is highly flexible, very durable, able to carry sufficient current and is inherently noncorrosive. The current carrying capacity of the filament should be about 2.5 amps over the entire surface of the paper and the density of the filament should be sufficiently high to provide for continuous contact with the paper and prevent non-uniform processing.

As seen in FIG. 2, the extrusion 52 is fitted into an F shaped member 56 having a back rounded wall 58 extending upwardly nearly to the top of extrusion 52 and a lower front wall 60 extending up the extrusion 52 to an extend less than the back wall 58. A frontally extending flange 62 contains mounting holes 64 and 66 as well as cutout portions 68 and 70 which are, for purposes of avoiding certain apparatus in the recorder, not shown.

Figure 3:
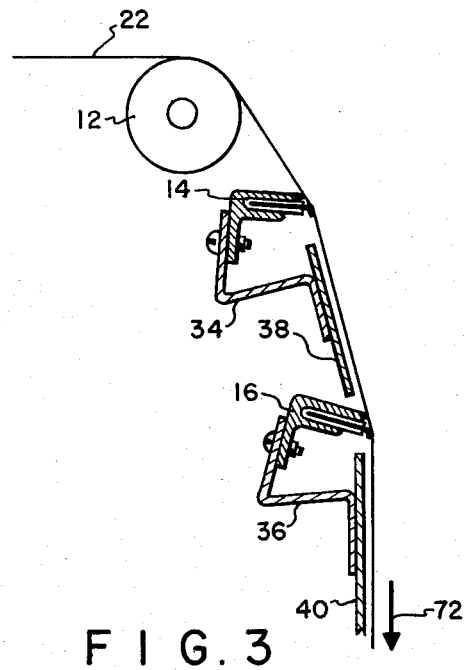
FIG. 3 is a detailed side view of the contact of the present invention and the paper from the recorder.

Referring to FIG. 3, the upper roller 12 is shown with the paper 22 passing thereover in the direction of arrow 72 and bending downwardly to the first contact structure 14. It is seen that the contact structure 14 is mounted by the Z shaped mounting member 34 to the backing 38 in such a way that the longer back extension 58 in FIG. 2 is in contact with the paper 22 and the ends of the wire brush 50 of FIG. 2 are bent over to provide a good contact with the paper backing. In similar fashion, the lower contact structure 16 is mounted by the Z shaped connection 36 to the backing member 40 in such a way that the longer or back portion of mounting member 58 in FIG. 2 is in contact with the paper and the wires 50 from FIG. 2 are again bent over in a direction that the paper moves shown by arrow 72. Having the longer rounded back portion in contact with the paper relieves some of the stress of the brush. In many cases, this arrangement may not be necessary. The backing members 38 and 40 are not in contact with the paper 22 since this would provide for unwanted heat dissipation.

It can be seen that the wire brushes make good contact with the paper continuously throughout its width and that if the paper is pulled backwards over the wire brushes, it will not cause any breakage of the elements therein.

It is therefore seen that I have provided an improved electrical contact for conductive-backed paper which overcomes the difficulties in the prior art. While I have shown my invention in connection with a preferred embodiment, alterations and modifications to the apparatus shown will occur to those skilled in the art. Accordingly, I do not intend to be limited by the specific disclosures used in connection with the description of the preferred embodiment but I intend only to be limited by the following claims.

The embodiments of the invention in which an exclusive property or right is claimed are defined as follows:

1. Apparatus for use in a recorder having a moving conductive-backed paper to supply electrical energy to the conductive backing comprising:

a wire brush for applying a uniform heating current to the paper, the brush including a sufficient number of wire bristles to contact the conductive backing in a substantially continuous fashion across the paper so that all portions of the paper proximate the brush are contacted, the wire bristles being fine enough to bend and make a flexible contact with the conductive backing; and means connecting the wire brush to a source of electrical energy.

2. Apparatus according to claim 1 wherein the wire elements are fixed in a conductive extrusion.

3. Apparatus according to claim 2 wherein the extrusion is mounted in a holder having an upwardly extending rounded back portion.

4. Apparatus according to claim 3 wherein the holder is mounted so that the upwardly extending rounded back portion is in contact with the paper and the wire bristles are bent so that the paper moves thereover without extreme tension.

5. Apparatus according to claim 1 wherein the wire elements are stainless steel filaments of about 12 micron diameter with a density of about 18,000 filaments per inch.

6. Apparatus according to claim 1 further including a second wire brush mounted to contact the paper at a position remote from the first named wire brush, the second wire brush being connected to ground so that current flows from the first named wire brush to the second wire brush through the conductive backing of the paper.

7. Apparatus according to claim 6 further including a roller in contact with the paper at a position remote from the first named wire brush on the opposite side of the first named wire brush from the second wire brush so that current also flows from the first named wire brush to the roller through the conductive backing of the paper.

* * * * *